F. D. WINKLEY.

LUBRICATING SYSTEM.

APPLICATION FILED OCT. 7, 1918.

Reissued June 10, 1919.

14,667.

2 SHEETS—SHEET 1.

Witnesses:
Andrew Winterscom
Earl F. Pierce

Inventor
Frank D. Winkley
By Williams, Bradbury & Lee
Attys.

F. D. WINKLEY.
LUBRICATING SYSTEM.
APPLICATION FILED OCT. 7, 1918.
Reissued June 10, 1919.
14,667.
2 SHEETS—SHEET 2.
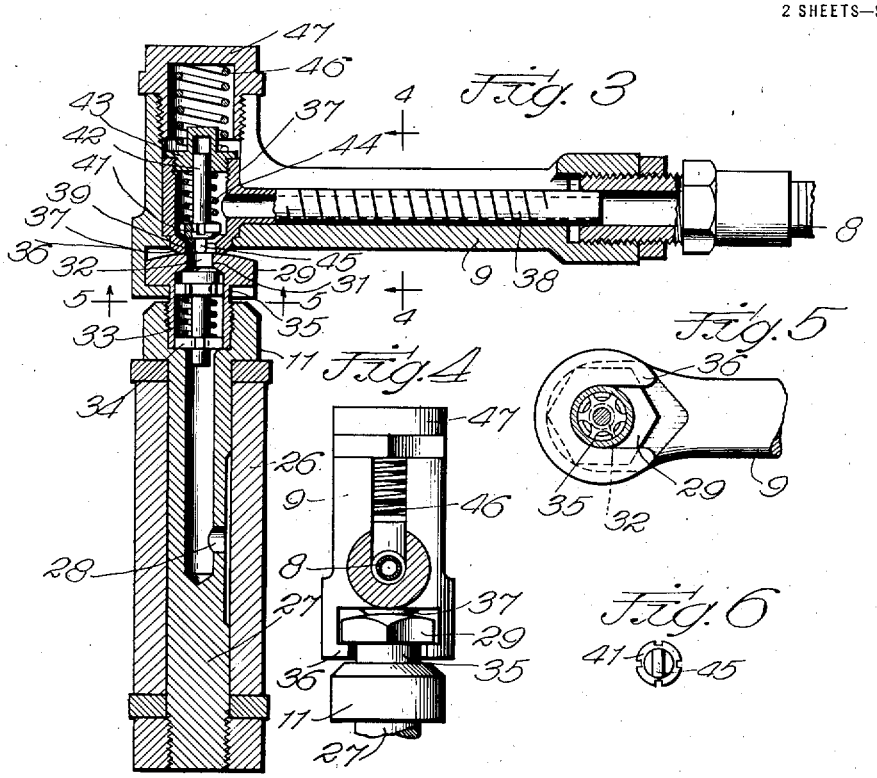
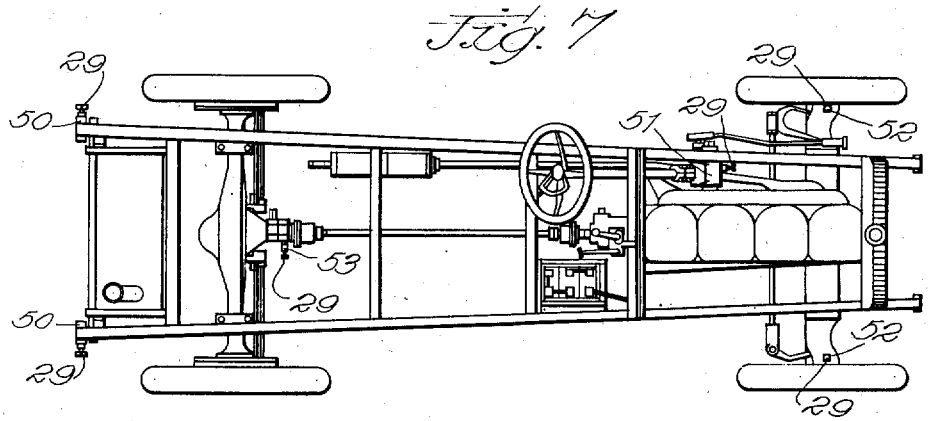
Witnesses:
Andrew Winterrowd,
Earl A. Pierce
Inventor
Frank D. Winkley
By Williams, Bradbury & Lee.
Attys.

UNITED STATES PATENT OFFICE.

FRANK D. WINKLEY, OF MADISON, WISCONSIN.

LUBRICATING SYSTEM.

14,667. Specification for Reissued Letters Patent. Reissued June 10, 1919.

Original No. 1,201,414, dated October 17, 1916, Serial No. 94,616, filed May 1, 1916. Application for reissue filed October 7, 1918. Serial No. 257,300.

*To all whom it may concern:*

Be it known that I, FRANK D. WINKLEY, a citizen of the United States, residing at Madison, in the county of Dane and State of Wisconsin, have invented certain new and useful Improvements in Lubricating Systems, of which the following is a specification.

This invention relates in general to lubricating systems and has more particular reference to a system for lubricating the various minor bearings, such as the spring-bolts, brake-operating mechanism, steering mechanism, etc., of a motor car.

Prior to my invention it has been customary to equip the various bearings of this character with grease cups from which grease was delivered to the bearings by screwing down the cups. It has been found, however, that grease is not entirely suitable as a lubricant for bearings of this character for the reason that it soon becomes mixed with abrasions from the working surfaces and other foreign matter, and hardens so that it fills up the oil passages and prevents adequate lubrication of the parts.

My present invention is designed to provide a lubricating system in which a fluid lubricant may be employed and by which it may be readily forced into the bearings under pressure so as to insure an adequate lubrication of the working parts.

Another object of my invention is to provide an improved oil receptacle as a part of the bearing to be lubricated, and to provide an oil supply nozzle which can be readily attached to and detached from the oil receptacle, and which, when attached, will form an oil-tight joint through which oil may be forced into the receptacle and to the bearings.

Another object of my invention is to provide a lubricating system embodying a flexible conduit and a swivel connection between the conduit and container or pressure cylinder, so that the nozzle carried by the conduit can be placed in any desired position so as to be readily attached to the oil receptacles of the various bearings on the car.

Still another object is to provide a system of this character which will be simple in construction, cheap to manufacture and easy to manipulate, and which will positively force the oil under any required pressure to the interior of the bearing to be oiled.

Various other objects and advantages of this invention will be readily appreciated as the same becomes better understood by reference to the following description when considered in connection with the accompanying drawings. Referring to the drawings—

Fig. 3 is an enlarged sectional view through the nozzle and the oil receptacle,

Figures 1, 2:
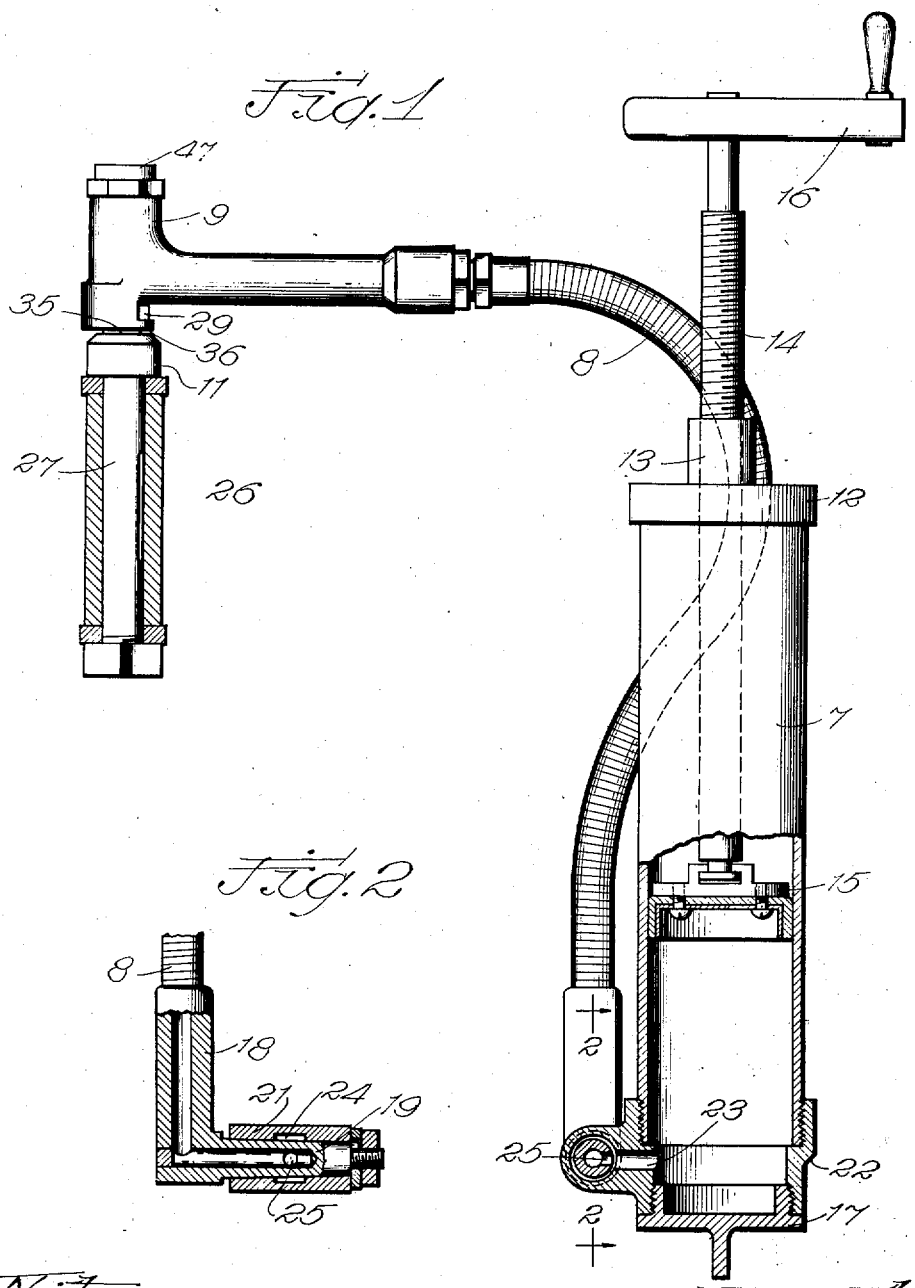
Figure 1 is a side elevation partially in section, of a lubricating system embodying my invention.
Fig. 2 is a fragmentary section view on the line 2—2 of Fig. 1.

Figs. 4 and 5 are sectional views on the lines 4—4 and 5—5 of Fig. 3,

Fig. 6 is an end view of the nozzle valve, and

Fig. 7 is a conventional plan view of an automobile chassis equipped with my lubricating system.

From the drawings it will be observed that my novel system comprises primarily an oil container or pump 7, a flexible conduit 8 equipped with a nozzle 9, and an oil receptacle 11 which forms a part of each bearing to be oiled.

More specifically the container 7 comprises a cylinder, as shown in Fig. 1, equipped at its upper end with a cap 12 having a tapped boss 13 through which the piston rod or spindle 14 is threaded. The lower end of this rod is rotatably connected to a piston or plunger 15 and the upper end is equipped with a handdle 16 by means of which the rod may be turned to move the piston longitudinally in the cylinder. The lower end of the cylinder is closed by a large removable cap 17, which may be unscrewed so that the cylinder can be filled with oil by holding it in inverted position beneath a faucet or other source of oil supply.

The flexible conduit 8 is connected with the container through a swivel joint which together with the flexibility of the conduit enables the nozzle 9 to be moved about to any desired position with respect to the container for attachment to the various oil receptacles on a car. By referring to Figs. 1 and 2 it will be observed that the conduit 8 emanates from a shank 18 having a laterally extending hollow trunnion 19 which is journaled in a hollow boss 21 formed integral with the bottom member 22 of the container. A passageway 23 leading from the container into the hollow boss terminates in an annular groove 24 which communicates with the interior of the trunnion 19 through a port 25.

The bearing, designated generally by reference character 26, in which my improved oil receptacle is embodied, comprises a hollow spindle 27 having an outlet port 28 through which oil is supplied to the surfaces to be lubricated. The upper end of the spindle, instead of being equipped with a grease cup, as has been customary prior to my invention, is provided with a head 29 which is threaded into the enlarged upper end of the spindle 27. This head has an oil receiving opening 31 in its top which is normally closed so as to exclude dust and dirt by a valve 32 which is machined to snugly fit the aperture. A coiled expansion spring 33 interposed between the lower face of the valve disk and a spider 34 disposed in the lower end of the shank 35 of the head normally retains this valve in closed position. It will be observed from Fig. 3 that the upper end of the valve lies flush with the upper face of the head so that the end of a bearing equipped with my oil receptacle presents a smooth and attractive appearance which is not complicated or disfigured by any permanent grease cup.

The free end of the flexible conduit 8 is threaded into the nozzle 9 which is shaped to provide on the bottom of its outer end a bifurcated portion 36 adapted to straddle the shank 35 of the oil receptacle head and to be engaged beneath this head, as shown in Fig. 3. Within the nozzle proper there is mounted what I term an oil cup 37 which communicates with the conduit 8 through a branch conduit 38. This cup has its lower end shaped to project outwardly beyond the plane of the nozzle proper toward the bifurcated portion 36, and this lower wall of the cup is equipped with a discharge aperture 39 which is normally closed by a valve 41 carried on a stem 42 which extends upwardly into a cap 43 threaded into the upper end of the cup. An expansion spring 44 surrounding the stem normally holds the valve in closed position, and when closed an extension 45 beneath the valve disk projects downwardly beyond the bottom of the cup. It will be observed from Fig. 6 that this extension 45 extends diametrically entirely across the discharge aperture 39 and is wider than the oil-receiving aperture 31 in the head 29 so that it will engage the head on both sides of the aperture when the nozzle is connected to the head.

The oil cup 37 is yieldingly mounted in the nozzle proper and is held downwardly therein with its bottom projecting beyond the plane of the nozzle proper by a relatively stiff expansion spring 46 interposed between the cap 43 of the cup and a cap 47 threaded into the top of the nozzle body. The lower end of the cup is therefore held in its lowermost position and the valve is normally maintained in closed position by the spring 44.

When it is desired to use my improved system the nozzle is attached to the head of the oil receptacle to which it is desired to deliver lubricant by engaging the bifurcated portion 36 of the nozzle beneath the head and sliding the nozzle transversely of the head or toward the right, viewing Fig. 3, into the position shown in this figure. The engagement of the extension 45 with the top of the head will open the valve 41 and the cup will yield upwardly against the spring 46 sufficiently to accommodate the device to heads of various thicknesses, but this spring will hold the bottom of the cup snugly against the head of the oil receptacle so as to provide an oil-tight joint at this point. After the nozzle has been attached the handle 16 is turned to force the plunger 15 downwardly in the container, thereby forcing oil under pressure through the conduit into the oil cup 36 and downwardly into the oil receptacle, the valve 32 in the receptacle being opened against the force of the spring 33 by the pressure of the inflowing oil. When sufficient lubricant has been delivered to the bearing a partial reverse rotation of the handle 16 will relieve the pressure in the cup and permit the valve 32 to close. The nozzle may then be detached from the head by slipping it off laterally, and as soon as the pressure against the extension 45 is released the valve 41 will be closed by its spring 44.

In Fig. 7 I have illustrated a conventional form of an automobile chassis equipped with my lubricating system. In this figure the spring-bolts 50, steering mechanism 51, steering knuckles 52, and propeller shaft bearing 53 are shown equipped with my lubricant heads 29. It is, of course, obvious that these lubricating heads may be used at any other points on the machine where it is desired to supply a lubricant to a bearing.

It will be obvious from the foregoing that I have provided a lubricating system in which the discharge nozzle can be very quickly attached to and detached from an oil-receiving receptacle of simple and economical construction, that the oil can be forced by my system positively into the receptacle and bearing in any desired quantities, and that when the system is not in use all leakage is precluded since the valve 41 is maintained at all times against its seat except when positively unseated by the act of attaching the nozzle to a properly constructed head. While I prefer to equip the bearings to be lubricated with oil receptacles of the character described, to which my improved nozzle may be detachably connected, it should be obvious that the oil receptacles could be structurally independent of the bearings if preferred and could be attached to the bearings at the time of oiling and detached therefrom after each oiling operation if preferred, the opening into the bearing being closed in the interim by a suitable plug.

It is believed that the construction and operation of my improved lubricating system will be understood from the foregoing without further description. While I have described my invention as particularly useful for supplying fluid lubricants to the bearings of mechanism it is, of course, obvious and to be understood that my invention is not limited to the use of the more fluid lubricants but can be employed for delivering any of the less fluid lubricants to a bearing. It is only necessary that the lubricant be sufficiently fluid to permit it to be discharged from the pump or container 7 into the head or receptacle 29. It should be also manifest that my invention is not restricted to the details of construction illustrated and described, as these details are capable of considerable modification and variation without departing from the scope of the invention as defined in the following claims.

I claim:

1. In a lubricating system, the combination of an oil receptacle having an oil-receiving opening, a valve normally closing said opening, a nozzle adapted to be detachably connected to said receptacle so as to form a tight joint with the receptacle, said nozzle having a delivery orifice arranged to aline with said opening in the receptacle when the receptacle and nozzle are connected, a valve mounted in said nozzle and constructed to be opened when the nozzle is connected to the receptacle, and means for supplying lubricant to said nozzle.

2. In a lubricating system, the combination of an oil receptacle having an oil-receiving opening, a valve normally closing said opening, a nozzle having an oil cup yieldingly mounted therein, said oil cup being provided with a delivery orifice, a valve normally closing said orifice, means whereby said nozzle and oil receptacle may be detachably connected together, and means for supplying lubricant to said oil cup.

3. In a lubricating system, the combination of an oil receptacle provided with a valved head, a nozzle provided with a bifurcated portion adapted to engage beneath said head, an oil cup yieldingly mounted in said nozzle and normally urged into engagement with said head when the parts are connected so as to form a tight joint between said head and the cup, and means for delivering lubricant through said cup to said receptacle.

4. In a lubricating system, the combination of an oil receptacle provided with a valved oil-receiving opening, a nozzle provided with a bifurcated portion having a discharge orifice and an oil cup yieldingly urged toward said bifurcated portion, a valve normally closing the discharge orifice from said cup, said valve being constructed to be opened when said nozzle is connected to said receptacle, and means for supplying lubricant to said nozzle.

5. In a lubricating system, the combination of a nozzle provided with means for detachably connecting the same to an oil receptacle, a cup yieldingly mounted in said nozzle and provided with a discharge orifice, a valve normally closing said orifice and having an extension through the orifice by which the valve is opened when the nozzle is connected to an oil receptacle, and means for supplying lubricant to said cup.

6. In a lubricating system, the combination of a nozzle comprising a yieldingly mounted oil-delivery device provided with a discharge orifice, a valve normally closing said orifice, and means for attaching said nozzle to an oil receptacle and simultaneously opening said valve.

7. In a lubricating system, the combination of a container, a flexible conduit connected to said container, a nozzle carried by the free end of said flexible conduit, a normally closed valve controlling the discharge orifice from said nozzle, and an oil receptacle constructed for detachable connection to said nozzle, said receptacle being adapted to open said nozzle valve when connection between the nozzle and said receptacle is established.

8. In a lubricating system, the combination of a container, a flexible conduit, a swivel connection between said conduit and said container, a headed oil receptacle, and a valve nozzle carried by said conduit and constructed for detachable locking connection with said oil receptacle by movement of said nozzle transversely of the receptacle.

9. The combination with a lubricant receptacle, of means for supplying lubricant thereto comprising a conduit, coacting means on said receptacle and said conduit for detachably connecting one end of said conduit with said lubricant receptacle comprising two relatively movable parts, one of said parts serving to secure said conduit to said receptacle and the other of said parts sealing the joint between said conduit and said receptacle, and means connected with the other end of said conduit for supplying lubricant thereto.

10. The combination with a lubricant receptacle, of means for supplying lubricant thereto comprising a conduit, means for detachably connecting one end of said conduit with said receptacle comprising a member secured to said conduit and a second member movable relatively to said first named member for contacting with an outer surface of said receptacle to maintain a fluid tight connection between said receptacle and said conduit.

11. The combination with a mechanism comprising a variety of bearings located at different points thereof, each bearing being provided with an aperture for receiving lubricant, of means for supplying lubricant to said apertures comprising a flexible conduit, means for successively attaching one end of said conduit with said apertures, and means for supplying lubricant under pressure to the other end of said conduit.

12. The combination with a lubricant receptacle of means for supplying lubricant thereto, under pressure, comprising a conduit having means for detachably securing it to said receptacle, a perforated member yieldably mounted in said first-named means for contacting with one end of said receptacle to seal the connection between said conduit and said receptacle, and spring means for yieldingly holding said yieldably-mounted means in contact with said receptacle.

13. The combination with a lubricant receptacle of means for supplying lubricant thereto under pressure, comprising a conduit having means for detachably securing it to said receptacle, a perforated member yieldably mounted in said first-named means, for contacting with said receptacle to seal the connection between said conduit and said receptacle, and spring means for yieldingly holding said yieldably-mounted means in contact with said receptacle.

14. The combination with a lubricant receptacle of means for supplying lubricant thereto under pressure, comprising a conduit having means for detachably securing it to said receptacle, and a perforated member yieldably mounted in said first-named means for contacting with said receptacle to seal the connection between said conduit and said receptacle.

15. The combination with a lubricant receptacle of means for supplying lubricant thereto under pressure comprising a conduit having means for detachably securing it to said receptacle, and a yieldable member for contacting with said receptacle and sealing the connection between said receptacle and said conduit.

16. The combination with a mechanism comprising a variety of bearings located at different points thereof, each bearing being provided with a lubricant receptacle, of means for supplying lubricant to said receptacles comprising a flexible conduit, means for successively attaching one end of said conduit with said receptacles, and means for supplying lubricant to the other end of said conduit under pressure.

17. The combination with a mechanism comprising a variety of bearings located at different points thereof and at different angles, each bearing being provided with an aperture for receiving lubricant, of means for supplying lubricant to said apertures comprising a conduit adapted to be flexed to reach the said apertures, quick detachable means for successively attaching one end of said conduit with said apertures comprising means for sealing the connection between said conduit and said bearings against the escape of lubricant, and means attached to the other end of said conduit for supplying lubricant thereto under pressure.

FRANK D. WINKLEY.